United States Patent [19]
Zaiser et al.

[11] Patent Number: 5,435,791
[45] Date of Patent: Jul. 25, 1995

[54] CHANGE-SPEED GEARBOX WITH THREE EPICYCLIC PARTIAL GEAR TRAINS

[75] Inventors: Wolfgang Zaiser, Steinheim; Hans Merkle, Stuttgart, both of Germany

[73] Assignee: Mercedes-Benz AG, Stuttgart, Germany

[21] Appl. No.: 153,191

[22] Filed: Nov. 17, 1993

[30] Foreign Application Priority Data

Nov. 18, 1992 [DE] Germany ............ 42 38 856.2

[51] Int. Cl.$^6$ .................. F16H 3/62; F16H 47/08
[52] U.S. Cl. .................................................. 475/276
[58] Field of Search ................................. 475/276

[56] References Cited

U.S. PATENT DOCUMENTS 3,811,343 5/1974 Mori et al. ............ 475/276
3,863,524 2/1975 Mori et al. .
5,112,285 5/1992 Hall, III ............ 475/280

FOREIGN PATENT DOCUMENTS 3248348 7/1984 Germany .
3248350 3/1988 Germany .
3935570 5/1990 Germany .
975941 11/1964 United Kingdom .
2243196 10/1991 United Kingdom .

*Primary Examiner*—Dirk Wright
*Attorney, Agent, or Firm*—Evenson, McKeown, Edwards & Lenahan

[57] ABSTRACT

In a change-speed gearbox with three epicyclic partial gear trains, an input shaft is connected directly to a co-axial gearwheel of the input-end partial gear train and, by means of a drive clutch, to a co-axial gearwheel of the output-end partial gear train. In the input-end partial gear train, two gear elements are connected by means of a lock-up clutch, the planet carrier being still connected with the one co-axial gearwheel of the third partial gear train. In the output-end partial gear train, the planet carrier is directly connected to an output shaft and the outer co-axial gearwheel is connected to a forward gear brake. In the third partial gear train, the planet carrier is connected both to the co-axial gearwheel of the output-end partial gear train, which can be connected to the input shaft, and to a reverse gear brake and the other co-axial gearwheel can be brought, by means of a second drive clutch, into drive connection with the co-axial gearwheel, of the output-end partial gear train, connected to the forward gear brake.

2 Claims, 1 Drawing Sheet

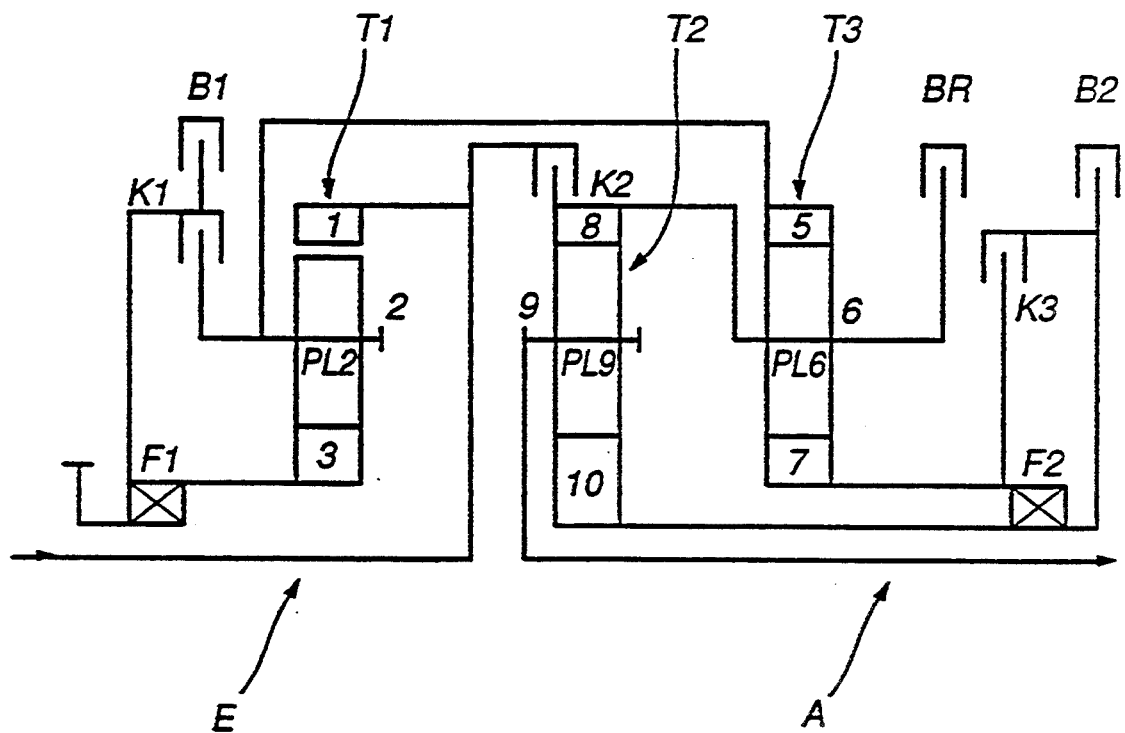

CHANGE-SPEED GEARBOX WITH THREE EPICYCLIC PARTIAL GEAR TRAINS

BACKGROUND AND SUMMARY OF THE INVENTION

The invention relates to a change-speed gearbox in with three epicyclic partial gear trains, each having an inner and an outer co-axial gearwheel and each having at least one planetary gearwheel in toothed engagement with the two co-axial gearwheels and supported on a planet carrier, and in which in input shaft is directly connected to one co-axial gearwheel of the input-end partial gear train and is connected to one co-axial gearwheel of the output-end partial gear train by means of a drive clutch, and in which, in the output-end partial gear train, the planet carrier is continuously connected to an output shaft and the other co-axial gearwheel is connected to a forward gear brake, and in which, in the input-end partial gear train, also the other co-axial gearwheel and the planet carrier continuously connected to one co-axial gearwheel of the third partial gear train can be fixed so that it cannot rotate relative to the input shaft by engaging in a lock-up clutch, and in which, in the third partial gear train, the planet carrier is both continuously connected to the co-axial gearwheel of the output-end partial gear train, which co-axial gearwheel can be connected to the input shaft, and is connected to a reverse gear brake and the other co-axial gearwheel has a drive connection with the co-axial gearwheel, connected to the forward gear brake, of the output-end partial gear train and can be put into an opposite direction of rotation of the input shaft by engaging the reverse gear brake, and in which, in a significant forward gear, both the drive clutch connected to the input shaft and the forward gear brake connected to one co-axial gearwheel of the output-end partial gear train are engaged and, in consequence, the gear transmission ratio is equal to the transmission ratio of the output-end partial gear train.

In a known change-speed gearbox of the type mentioned above (U.S. Pat. No. 3,863,524, FIG. 6), the inner co-axial gearwheel of the output-end partial gear train and the inner co-axial gearwheel of third partial gear train, used as the reversing train in reverse gear, are rigidly connected together by means of a coupling shaft connected to the forward gear brake in accordance with the known Simpson design. In the significant forward gear, in this case in the third gear, the co-axial gearwheel, connected to the planet carrier of the input-end partial gear train, of the third partial gear train is consequently driven with a step-up ratio relative to the input shaft although no torque is being transmitted to the output shaft in this power path. The fact that in the input-end partial gear train, the rotational speed of the planet carrier—which is higher than the rotational speed of the input shaft—has a further step-up transmission ratio relative to the rotational speed of the second co-axial gearwheel is particularly disadvantageous in this case.

From DE 32 48 350 C2, a change-speed gearbox of a different generic type with four epicyclic partial gear trains is known with, in each case, an inner and an outer co-axial gearwheel and with at least one planetary gearwheel, which is supported on a planet carrier and is in engagement with both co-axial gearwheels. In this change-speed gearbox, the fourth partial gear train alone forms the gear transmission ratio in a gear designed as the overdrive gear. For this purpose, it can be connected—when the input shaft is connected to the input-end partial gear train by means of two engaged drive clutches and the input-end partial gear train rotates, in consequence, as a block—to the input shaft by means of is planet carrier via a fourth drive clutch and the input-end partial gear train located in series in the force path. The overdrive gear transmission ratio is then formed in such a way that in the fourth partial gear train, the inner co-axial gearwheel is brought to rest by a gear brake so that the planet carrier connected to the input shaft drives the outer co-axial gearwheel with a step-up ratio, which outer co-axial gearwheel is connected to the output shaft via the planet carrier of the output and partial gear train.

In this known change-speed gearbox, the gear brake connected to the inner co-axial gearwheel of the fourth partial gear train used as the overdrive gear transmission ratio is also used to form the gear transmission ratio of the significant forward gear, in which the gear transmission ratio is equal to the transmission ratio of the output-end partial gear train. For this purpose, the inner co-axial gearwheel, which is connected to the gear brake, of the fourth partial gear train is connected to the inner co-axial gearwheel of the output-end partial gear train by means of a third drive clutch which, together with the gear brake, is engaged in the significant forward gear in which the outer co-axial gearwheel, which is in continuous drive connection with the coupling shaft of the input-end partial gear train, is driven by the input shaft when both drive clutches of the input-end partial gear train are engaged.

In this known change-speed gearbox, the output-end partial gear train does not participate in the torque conversion in the forward gear designed as the overdrive gear, and its inner co-axial gearwheel, due to the disengaged condition of the third drive clutch, rotates as a free gear element with a rotational speed which has a further step-up ratio relative to the rotational speed of the output shaft, which already has a step-up ratio.

The object on which the invention is based consists essentially in creating a change-speed gearbox which has three epicyclic partial gear trains and which, as far as possible, in all gears avoids the possibility of gear elements not participating in the torque transmission having substantially higher rotational speeds than the input shaft.

The object explained is achieved in an advantageous manner, in accordance with the invention, by providing an arrangement wherein a second drive clutch is used as the drive connection between the co-axial gearwheel which can be put into the opposite direction of rotation, of the third partial gear train and the co-axial gearwheel, connected to the forward gear brake, of the output-end partial gear train, and wherein the significant forward gear, the lock-up clutch of the input-end partial gear train is additionally engaged but the second drive clutch, is on the contrary, disengaged.

In the change-speed gearbox according to the invention, the second co-axial gearwheel of the third partial gear train, which is released in its drive connection from the second co-axial gearwheel of the output-end partial gear train, rotates as a free gear element in the significant forward gear and, in the third partial gear train, both the planet carrier (due to the engaged drive clutch) and the first co-axial gearwheel (due to the engaged lock-up clutch of the input-end partial gear train) have the rotational speed of the input shaft. In consequence, the third partial gear train and also the input-end partial gear train each respectively rotate as a block so that no higher rotational speeds can occur in these partial gear trains not participating in the torque transmission.

In the known change-speed gearbox forming the generic type, the direct fourth gear is the highest gear whereas, in the significant third gear, the gear transmission ratio is maintained by the transmission ratio of the output-end partial gear train alone.

In order to obtain a fifth gear in the known change-speed gearbox forming the generic type, either a fourth epicyclic partial gear train is provided or a second coupling shaft is provided between the input-end partial gear train, on the one hand, and the two other partial gear trains, on the other.

In the change-speed gearbox according to the invention, a fifth gear is made possible by means of an arrangement wherein in a further forward gear, the two drive clutches and and also a gear brake connected to the other co-axial gearwheel of the input-end partial gear train are engaged.

BRIEF DESCRIPTION OF THE DRAWINGS

FIG. 1 shows a gearbox diagram of a change-speed gearbox with five forward gears, constructed in accordance with a preferred invention; and FIG. 2 shows a table of the selection means activated in the individual gears for the gearbox.

DETAILED DESCRIPTION OF THE DRAWINGS

Referring to FIG. 1, a change-speed gearbox has three in-line epicyclic partial gear trains T1, T2 and T3, each with an inner and outer co-axial gearwheel. An input shaft E, which can be driven by a driving engine, possibly via a hydrodynamic torque converter, is directly connected to the outer co-axial gearwheel 1 of one partial gear train T1 arranged at the input end and, by means of a first drive clutch K2, to the outer co-axial gearwheel 8 of the second partial gear train T2, arranged at the output end. An output shaft A, which can be connected in known manner to vehicle wheels, is connected to the planet carrier 9 of the output-end partial gear train T2, whose inner co-axial. Gearwheel is connected to a forward gear brake B2. At least one planetary gearwheel PL9, which is in engagement with the two co-axial gearwheels 8 and 10, is rotatably supported on the planet carrier 9.

The inner co-axial gearwheel 3 of the input-end partial gear train T1 is connected both to a gear brake B1 and, via a lock-up clutch K1, to the planet carrier 2 of this partial gear train. In addition, the inner co-axial gearwheel 3 is connected to an overrunning clutch F1 arranged to be effectively parallel to the gear brake B1. At least one planetary gearwheel PL2, which is in engagement with the two co-axial gearwheels 1 and 3, is rotatably supported on the planet carrier 2. The planet carrier 2 is connected to the outer co-axial gearwheel of the third partial gear train T3, whose planet carrier 6 is connected both ~o the outer co-axial gearwheel 8 of the output-end partial gear train T2 and to a reverse gear brake BR. The inner co-axial gearwheel 7 of the third partial gear train T3 is connected to the inner co-axial gearwheel of the output-end partial gear train T2 both by a second drive clutch K3 and by an overrunning clutch F2. At least one planetary gearwheel PL6, which is in engagement with both co-axial gearwheels 5 and 7, is rotatably supported on the planet carrier 6 of the third partial gear train T3.

The overrunning clutches F1 and F2 are not necessary per se for forming the gear transmission ratios and are only used to facilitate the control of the associated selection means B1 and K3, which are located in parallel.

The five forward gears and the reverse gear are formed as follows, in accordance with the table of FIG. 2.

In order to select first gear, the drive clutch K3, the gear brake B1 and the forward gear brake B2 are engaged. In this way, the inner- co-axial gearwheels 3, 7 and 10 of all three partial gear trains T1, T2 and T3 are brought to rest so that the gear transmission ratio is obtained by the multiplicative association of the transmission ratios of the three partial gear trains.

In second gear, the forward brake B2, the second drive clutch K3 and the lock-up clutch K1 of the input-end partial gear train T1 are engaged. In this way, the input-end partial gear train T1 rotates as a block so that the outer co-axial gearwheel of the third partial gear train T3 is driven with the rotational speed of the input shaft E, whereas the inner co-axial gearwheels 7 and 10 of the two partial gear trains T2 and T3 are brought to rest. In consequence, the gear transmission ratio is given by the multiplicative association of the transmission ratios of the two partial gear trains T2 and T3.

In the significant third gear, the forward gear brake B2, the lock-up clutch K1 of the input-end partial gear train TI and the drive clutch K2 connected to the input shaft E are engaged. The outer co-axial gearwheel 8 of the output-end partial gear train T2 is therefore driven with the rotational speed of the input shaft E, whereas the inner co-axial gearwheel of this partial gear train T2 is brought to rest. The gear transmission ratio is consequently formed exclusively in the output-end partial gear train T2.

In this significant gear, the gear elements of the input-end partial gear train T1 all have the rotational speed of the input shaft E because the lock-up clutch K1 is engaged. This also applies to the gear elements of the third partial gear train T3 because, in the latter, both the outer co-axial gearwheel (indirectly via the lock-up clutch K1) and the planet carrier 6 (through the drive clutch K2) are torsionally connected to the input shaft E and because this is made possible by the disengaged condition of the second drive clutch K3 and the degree of freedom of the inner co-axial gearwheel 7 achieved by this means.

In the direct fourth gear, all the clutches K1, K2 and K3 are engaged so that all three partial gear trains T1, T2 and T3 respectively rotate as blocks and, in consequence, the input and output shafts E and A are torsionally connected to one another.

In the fifth gear, which is designed as the over drive gear, the two drive clutches K2 and K3 and the gear brake B1 of the input-end partial gear train T1 are engaged. In the third partial gear train T3, the outer co-axial gearwheel therefore rotates more slowly because of its connection to the planet carrier 2 which is rotating more slowly than the input shaft E—than the planet carrier 6, which rotates with the speed of the input shaft E because of its connection to the latter. In consequence, the inner co-axial gearwheel 7 in the third partial gear train T3 is driven with a step-up ratio relative to the input shaft E. Because, in the output-end partial gear train T2, the outer co-axial gearwheel 8 has the rotational speed of the input shaft E and the inner co-axial gearwheel is connected to the inner co-axial gearwheel 7, which rotates with a step-up ratio, of the third partial gear train T3, the output shaft A is also driven with a step-up ratio but at a rotational speed which is reduced, corresponding to the transmission ratio, relative to the rotational speed of the inner co-axial gearwheel.

In reverse gear, the reverse gear brake BR, the gear brake B1 of the input-end partial gear train T1 and the drive clutch K3, which is connected to the inner co-axial gearwheels 7 and 10, are engaged. In this way, the outer co-axial gearwheel which is connected to the planet carrier 2 (which rotates more slowly than the input shaft E) of the input-end partial gear train T1 of the third partial gear train T3 (then operating as the reverse gear train) is driven with a step-down ratio in the forward rotational direction, whereas the inner co-axial gearwheel 7 is driven in the reverse rotational direction with a rotational speed which is more rapid (corresponding to the transmission ratio) than that of the outer co-axial gearwheel because the planet carrier 6 is brought to rest. In consequence, the inner co-axial gearwheel, which is connected by the drive clutch K3 to the inner co-axial gearwheel 7 of the third partial gear train T3, of the output-end partial gear train T2 rotates in the reverse rotational direction so that the output shaft A is also driven in the reverse rotational direction at a rotational speed which is reduced (corresponding to the transmission ratio of the partial gear train T2) relative to the rotational speed of the inner co-axial gearwheel 10.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A change-speed gearbox comprising three epicyclic gear trains, including an input gear train, an output gear train and a third gear train;
    and an input shaft connected directly to a ring gear of the input gear train and, by means of a drive clutch, to a ring gear of the output gear train;
    wherein two gear elements in the input gear train are connected by means of a lock-up clutch, the planet carrier being still connected with the one ring gear of the third gear train;
    wherein the planet carrier of the output gear train is directly connected to an output shaft and the ring gear of the output gear train is connected to a forward gear brake;
    wherein the planet carrier in the third gear train is connected both to the ring gear of the output gear train, which can be connected to the input shaft, and to a reverse gear brake, and
    wherein the other ring gear can be brought, by means of a second drive clutch, into drive connection with the ring gear of the output gear train connected to the forward gear brake.

2. A change-speed gearbox according to claim 1, wherein, in a further forward gear, the two drive clutches and also a gear brake connected to the other ring gear of the input gear train are engaged.

* * * * *